(12) United States Patent
Mallin et al.

(10) Patent No.: US 10,876,591 B2
(45) Date of Patent: Dec. 29, 2020

(54) DAMPER HYDRAULIC COMPRESSION STOP CUP

(71) Applicant: Tenneco Automotive Operating Company Inc., Lake Forest, IL (US)

(72) Inventors: Thomas P. Mallin, Temperance, MI (US); Gary W. Groves, Monroe, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 16/274,575

(22) Filed: Feb. 13, 2019

(65) Prior Publication Data
US 2020/0256420 A1   Aug. 13, 2020

(51) Int. Cl.
| *B21D 17/02* | (2006.01) |
| *F16F 9/49* | (2006.01) |
| *F16F 9/19* | (2006.01) |
| *F16F 9/512* | (2006.01) |

(52) U.S. Cl.
CPC .............. *F16F 9/49* (2013.01); *F16F 9/19* (2013.01); *F16F 9/5126* (2013.01)

(58) Field of Classification Search
CPC ..... F16F 9/48; F16F 9/165; F16F 9/49; B60G 13/08; B60G 17/08; B60G 15/065; B21D 17/02
USPC .... 188/275, 282.7, 282.8, 288, 315, 322.13, 188/322.22, 322.15
See application file for complete search history.

(56) References Cited

U.S. PATENT DOCUMENTS

| 2,729,308 A | 1/1956 | Koski et al. |
| 2,984,321 A | 5/1961 | Schultze |
| 3,447,644 A | 6/1969 | Duckett |
| 4,852,703 A | 8/1989 | Nishimoto |
| 5,150,775 A * | 9/1992 | Charles .................. B60G 17/08 188/266.3 |
| 5,157,806 A | 10/1992 | Wartian |
| 5,249,652 A | 10/1993 | Leitzman et al. |
| 6,814,193 B2 | 11/2004 | Grundei |
| 9,091,320 B1 | 7/2015 | Smith et al. |
| 9,593,697 B2 * | 3/2017 | Baalmann ................ F16F 9/49 |

(Continued)

FOREIGN PATENT DOCUMENTS

| CN | 108006145 A | 5/2018 |
| DE | 29910104 U1 | 7/2000 |

(Continued)

*Primary Examiner* — Christopher P Schwartz
(74) *Attorney, Agent, or Firm* — Harness Dickey & Pierce

(57) ABSTRACT

A shock absorber includes a pressure tube, a rod, a rod guide, a first piston, a second piston, and a cup. The pressure tube has an inner surface that defines a fluid chamber. The rod extends into the pressure tube. The rod guide locates the rod relative to the pressure tube. The first piston is coupled to the rod and divides the fluid chamber into an upper working chamber and a lower working chamber. The second piston is coupled to the rod and disposed within the lower working chamber. The cup has an open end configured to receive the second piston and a closed end opposite of the open end. The cup includes a sidewall and a bottom wall. The sidewall includes a cylindrical section and a flared section. The bottom wall forms the closed end of the cup, extends radially outward of the sidewall, and supports the pressure tube.

17 Claims, 7 Drawing Sheets

(56) References Cited

U.S. PATENT DOCUMENTS

| | | | |
|---|---|---|---|
| 9,605,726 | B2 | 3/2017 | Baldoni et al. |
| 9,695,899 | B2 | 7/2017 | Smith et al. |
| 9,776,468 | B2 | 10/2017 | Teraoka et al. |
| 9,909,638 | B2 | 3/2018 | Chyla et al. |
| 9,982,738 | B2 | 5/2018 | Lizarraga Senar |
| 10,208,830 | B2 * | 2/2019 | Bruno ................... F16F 9/3465 |
| 2008/0053765 | A1 | 3/2008 | Tomonaga et al. |
| 2010/0059321 | A1 | 3/2010 | Boivin |
| 2015/0090548 | A1 | 4/2015 | Yamanaka |
| 2015/0247549 | A1 | 9/2015 | Takeno et al. |
| 2016/0223045 | A1 * | 8/2016 | Baldoni ............... B60G 15/062 |
| 2016/0230835 | A1 | 8/2016 | Groves et al. |
| 2017/0009840 | A1 | 1/2017 | Hertz |
| 2018/0058533 | A1 * | 3/2018 | Bruno ................... B60G 13/08 |
| 2018/0119770 | A1 | 5/2018 | Bruno et al. |
| 2018/0223942 | A1 | 8/2018 | Kus et al. |

FOREIGN PATENT DOCUMENTS

| | | |
|---|---|---|
| DE | 102004008956 A1 | 9/2005 |
| DE | 102014223480 A1 | 5/2016 |
| DE | 102015121140 A1 | 6/2017 |
| EP | 2302252 B1 | 11/2012 |
| JP | 2016065626 A | 4/2016 |
| WO | WO-2014137661 A1 | 9/2014 |
| WO | 2018155339 A1 | 8/2018 |

* cited by examiner

DAMPER HYDRAULIC COMPRESSION STOP CUP

FIELD

The present disclosure relates to hydraulic dampers or shock absorbers for use in a suspension system of an automotive vehicle, and more particularly, to damper hydraulic compression stop cups.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Shock absorbers are used in automotive suspension systems to absorb unwanted vibrations that occur during driving. To absorb the unwanted vibrations, shock absorbers are generally connected between the sprung portion (e.g., body) and the unsprung portion (e.g., control arms, knuckle) of the automobile. A piston is located within a pressure tube of the shock absorber, and the pressure tube is connected to one of the unsprung and sprung portions of the vehicle. The piston is connected to the other one of the sprung portion and unsprung portion of the automobile through a piston rod which extends into the pressure tube. The piston divides the pressure tube into an upper working chamber and a lower working chamber, which are both filled with hydraulic fluid (e.g., oil).

The piston limits the flow of the hydraulic fluid between the upper and the lower working chambers when the shock absorber is compressed or extended. Thus, the shock absorber produces a damping force which counteracts the vibration that would otherwise be transmitted from the unsprung portion to the sprung portion of the vehicle. In a dual-tube shock absorber, a fluid reservoir or reserve chamber is defined between the pressure tube and a reserve tube, and a base valve is located between the lower working chamber and the reserve chamber. The base valve limits the flow of the hydraulic fluid between the lower working chamber and the reservoir chamber when the shock absorber is compressed or extended. Thus, the base valve also produces a damping force which counteracts the vibrations that would otherwise be transmitted from the unsprung portion of the vehicle to the sprung portion of the automobile.

Some shock absorbers include a second piston that is connected to the piston rod distal of the first piston, and a cup disposed within the pressure tube. The cup has an open end configured to receive the second piston and a closed end opposite of the open end. When these shock absorbers begin their compression stroke, the second piston is disposed outside of the cup and therefore has little to no effect on the damping force. However, as these shock absorbers near the end of their compression stroke, the second piston enters an interior cavity of the cup and pressurizes hydraulic fluid in the interior cavity. In turn, the pressurized hydraulic fluid provides a stopping force that dampens the movement of the piston rod. Thus, the cup is referred to as a hydraulic compression stop (HCS) cup, and the second piston is referred to as an HCS piston.

As discussed above, some shock absorbers include an HCS cup disposed within a pressure tube, and the HCS cup has an interior cavity that receives an HCS piston near the end of a compression stroke. The HCS piston pressurizes hydraulic fluid within the HCS cup, which dampens the motion of a piston rod connected to the HCS cup. Since the HCS cup is disposed within the pressure tube and the HCS piston engages the inner surface of the HCS cup, the diameter the HCS piston is significantly less than the diameter of the pressure tube. Thus, when the HCS piston is disposed outside of the interior cavity of the HCS cup, the HCS piston is not constrained in the radial direction and therefore may become misaligned with the interior cavity.

To address this issue, an HCS cup may have a tapered inner surface at its open end that guides the HCS piston into the interior cavity of the HCS cup. However, HCS cups are typically constrained in the radial direction at their open end, and therefore the HCS piston may be damaged as the tapered inner surface of the HCS cup forces the HCS piston into alignment with the interior cavity of the HCS cup. For example, some HCS cups are formed from metal and have an open end that is rigidly attached to the inner surface of a pressure tube by, for example, welding the open end to the inner surface. In addition, welding the open end of the HCS cup to the inner surface of the pressure tube may be difficult and time-consuming, and may cause the interior cavity of the HCS cup to be misaligned (e.g., not coaxial) with the pressure tube and the HCS piston.

Some HCS cups are formed from plastic and are retained in the axial direction by a ledge on the inner surface of the pressure tube that engages the HCS cups. Retaining an HCS cup in this manner avoids the need to weld the HCS cup to the inner surface of the pressure tube. However, plastic HCS cups wear and tear quickly and are typically not as strong as metal HCS cups. To address this strength issue, a plastic HCS cup typically has a thicker wall compared to steel HCS cups, and a plastic HCS cup typically includes longitudinal ribs disposed on the outer surface thereof for support against the pressure tube. Both of these features reduce the available fluid flow area.

During a compression stroke, hydraulic fluid flows between the outside of the HCS cup and the inside of the pressure tube, through the base valve, and to the reservoir chamber. Conversely, during the rebound stroke, fluid flows from the reservoir chamber, through the base valve, and around the outside of the HCS cup. Piston rods having larger sizes require considerably more fluid flow around the outside of the HCS cup to and from the base valve relative to piston rods have smaller sizes. If the available fluid flow area is too small due to, for example, the thicker walls and the longitudinal ribs associated with plastic HCS cups, then cavitation occurs in the compression chamber, which causes lags at the beginning of the compression stroke.

Some HCS cups have ports near their open end that allow some fluid flow from the interior cavity of the HCS cup to the outside of the HCS cup when the HCS piston enters the interior cavity, which avoids a rapid spike in the amount of damping provided by a shock absorber. However, the ports are typically spaced apart from the open end, and therefore the ports typically have a circular or other shape that is not optimized for fluid flow. Thus, the ports do not achieve the goal of avoiding rapid spikes in damping.

SUMMARY

A first example of a shock absorber according to the present disclosure includes a pressure tube, a rod, a rod guide, a first piston, a second piston, and a cup. The pressure tube has an inner surface that defines a fluid chamber. The rod extends into the pressure tube. The rod guide is disposed in the pressure tube. The rod guide radially locates the rod relative to the pressure tube. The first piston is coupled to the rod and disposed within the fluid chamber. The first piston divides the fluid chamber into an upper working chamber and a lower working chamber. The second piston is coupled to the rod and disposed within the lower working chamber of the pressure tube. The cup is disposed within the lower working chamber of the pressure tube. The cup has an open end configured to receive the second piston and a closed end opposite of the open end. The cup includes a sidewall and a monolithic bottom wall. The sidewall includes a cylindrical section and a flared section. The cylindrical section extends from the closed end of the cup to the flared section. The flared section extends from the cylindrical section to the open end of the cup. The flared section is configured to radially locate the cup relative to the pressure tube and to guide the second piston into the cylindrical section. The bottom wall forms the closed end of the cup, extends radially outward of the sidewall, and supports the pressure tube.

In one example, the bottom wall defines a ledge, and the pressure tube is seated in the ledge and attached to the ledge.

In one example, at least one of the sidewall and the bottom wall is attached to the pressure tube and the base valve, and the shock absorber further includes a reservoir tube and a base valve. The reservoir tube surrounds the pressure tube. The base valve is disposed in the reservoir tube near an end thereof and is configured to regulate fluid flow from the lower working chamber of the pressure tube to a reservoir chamber defined between the pressure tube and the reservoir tube.

In one example, the bottom wall is press fit to an outer radial surface of the base valve.

In one example, the open end of the cup contacts the inner surface of the pressure tube.

In one example, the open end of the cup is spaced apart from the inner surface of the pressure tube by a gap.

In one example, the cup is made from metal, the pressure tube has a first diameter, the cylindrical section of the cup has a second diameter that is less than the first diameter, and the flared section of the cup is tapered radially outward in an axial direction from the cylindrical section of the cup to the open end of the cup.

In one example, the flared section has a third diameter at the open end of the cup, and the third diameter is less than the first diameter and greater than the second diameter.

In one example, a difference between the first and third diameters yields at least one of a clearance fit and a location fit between the open end of the cup and the pressure tube.

A second example of a shock absorber according to the present disclosure includes a pressure tube, a rod, a rod guide, a first piston, a second piston, and a cup. The pressure tube defines a fluid chamber. The rod extends into the pressure tube. The rod guide is disposed in the pressure tube. The rod guide radially locates the rod relative to the pressure tube. The first piston is coupled to the rod and disposed within the fluid chamber. The first piston divides the fluid chamber into an upper working chamber and a lower working chamber. The second piston is coupled to the rod and disposed within the lower working chamber of the pressure tube. The cup is disposed within the lower working chamber of the pressure tube. The cup has an open end configured to receive the second piston and a closed end opposite of the open end. The cup has an inner surface defining an interior cavity and an outer surface cooperating with the pressure tube to define an intermediate chamber therebetween. The cup includes a cylindrical section and a flared section. The cylindrical section extends from the closed end of the cup to the flared section. The flared section extends from the cylindrical section to the open end of the cup. The flared section is configured to radially locate the cup relative to the pressure tube. The flared section defines a plurality of ports disposed about the open end of the cup and forming fluid passageways for fluid flow from the lower working chamber to the intermediate chamber defined between the outer surface of the cup and the pressure tube.

In one example, each of the plurality of ports is U-shaped and has an open end that is axially aligned with the open end of the cup.

In one example, the cup includes a sidewall and a bottom wall, the sidewall forms the cylindrical section and the flared section, and the bottom wall forms the closed end of the cup.

In one example, the bottom wall of the cup is welded to the sidewall of the cup.

A third example of a shock absorber according to the present disclosure includes a pressure tube, a rod, a rod guide, a first piston, a second piston, and a cup. The pressure tube defines a fluid chamber. The rod extends into the pressure tube. The rod guide is disposed in the pressure tube. The rod guide radially locates the rod relative to the pressure tube. The first piston coupled to the rod and disposed within the fluid chamber. The first piston divides the fluid chamber into an upper working chamber and a lower working chamber. The second piston is coupled to the rod and disposed within the lower working chamber of the pressure tube. The cup is disposed within the lower working chamber of the pressure tube. The cup has an open end configured to receive the second piston and a closed end opposite of the open end. The cup includes a monolithic sidewall and a bottom wall. The sidewall includes a cylindrical section and a flared section. The cylindrical section extends in a first direction from the closed end of the cup to the flared section. The flared section extends in the first direction from the cylindrical section to the open end of the cup. The flared section is configured to radially locate the cup relative to the pressure tube. The bottom wall forms the closed end of the cup. The sidewall extends axially beyond the bottom wall in a second direction opposite of the first direction and supports the pressure tube.

In one example, the sidewall defines a ledge, and the pressure tube is seated in the ledge and attached to the ledge.

In one example, the sidewall is attached to the pressure tube and the base valve, and the shock absorber further includes a reservoir tube and a base valve. The reservoir tube surrounds the pressure tube. The base valve is disposed in the reservoir tube near an end thereof and is configured to regulate fluid flow from the lower working chamber of the pressure tube to a reservoir chamber defined between the pressure tube and the reservoir tube.

In one example, the sidewall is press fit to an outer radial surface of the base valve.

In one example, the cup has an inner surface defining an interior cavity and an outer surface that is tapered radially outward along the flared section, the cup has a plurality of grooves on the inner surface thereof that extend from the open end of the cup to the cylindrical section, and the plurality of grooves allow fluid flow out of the interior cavity of the cup past the second piston as the second piston enters the interior cavity of the cup.

In one example, the flared section of the cup includes a plurality of tabs separated by a plurality of ports, the plurality of tabs projecting radially outward relative to the cylindrical section of the cup, each of the grooves being aligned with one of the tabs, the plurality of ports extending to the open end of the cup.

In one example, each of the grooves has a first width at the open end of the cup and a second width in the cylindrical section of the cup, the second width being less than the first width.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An HCS cup according to the present disclosure includes several features that address the deficiencies noted above. In one example, the HCS cup has an open end that is detached from the pressure tube and a closed end that is press fit to the base valve. In one example, a bottom wall of the HCS cup extends radially beyond a sidewall of the cup and is press fit to the base valve. In another example, the sidewall of the HCS cup extends axially beyond the bottom wall of the cup and is press fit to the base valve. In either example, the portion of the HCS cup that is press fit to the base valve (e.g., the bottom wall or the sidewall) may form a ledge that supports the pressure tube. Since the closed end of the HCS cup is press fit to the base valve, there is no need to attach (e.g., weld) the open end of the HCS cup to the pressure tube.

In addition, the portion of the HCS cup that is press fit to the base valve (e.g., the bottom wall or the sidewall) may be formed as a single piece, which reduces the cost and complexity of the HCS cup and improves the ease of manufacturing the HCS cup. Also, there may be a small gap between the open end of the HCS cup and the inner surface of the pressure tube so that the open end can deflect in the radial direction to absorb any contact forces caused by radial misalignment of the HCS piston relative to the HCS cup. Thus, this manner of securing the HCS cup within the pressure tube may prevent the HCS piston from being damaged when the HCS piston is misaligned with the HCS cup.

Moreover, this manner of securing the HCS cup within the pressure tube enables the HCS cup to be made from metal. Thus, in contrast to plastic HCS cups, the HCS cup does not need to have thicker walls and or longitudinal ribs on the outside thereof. As a result, the available area for fluid flow around the outside of the HCS cup is maximized, which reduces the likelihood of cavitation occurring in the compression chamber and thereby avoids lags at the beginning of the compression stroke.

Further, in one example, the HCS cup may have ports that extend to the open end of the HCS cup so that the shape of the ports can be optimized for fluid flow. For example, the ports may be U-shaped with open ends that are axially aligned with the open end of the HCS cup. In turn, a greater amount of fluid may be allowed to flow from the interior cavity of the HCS cup to the outside of the HCS cup when the HCS piston enters the interior cavity, which may avoid a rapid spike in the amount of damping provided by the shock absorber.

Figure 1:
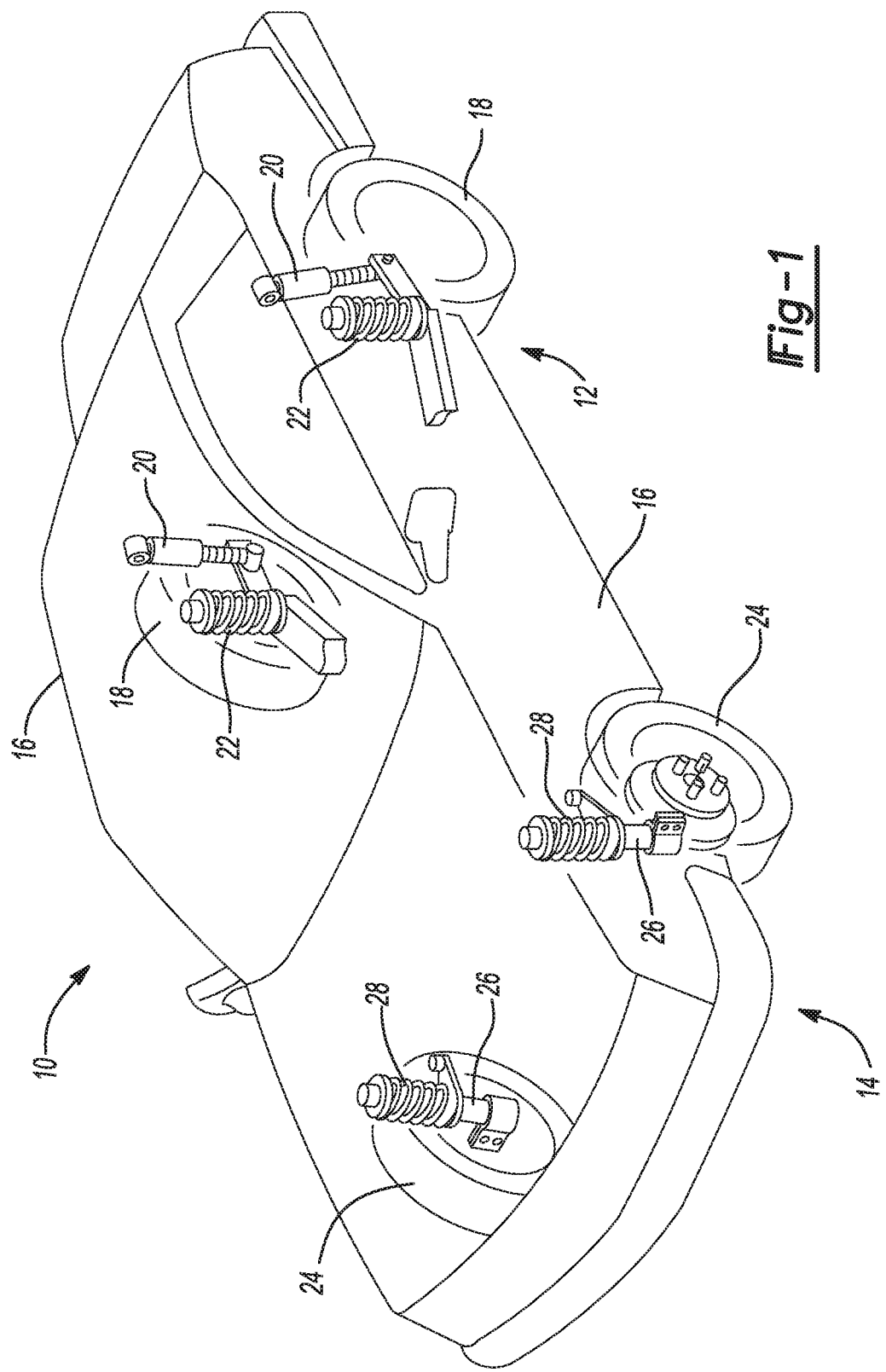
FIG. 1 is a perspective view of an example vehicle including hydraulic dampers or shock absorbers according to the principles of the present disclosure.

Referring now to FIG. 1, a vehicle 10 includes a rear suspension 12, a front suspension 14, and a body 16. The rear suspension 12 has a transversely extending rear axle assembly (not shown) to which rear wheels 18 of the vehicle 10 are mounted. The rear axle assembly is operatively connected to the body 16 by a pair of shock absorbers 20 and a pair of helical coil springs 22. Similarly, the front suspension 14 includes a transversely extending front axle assembly (not shown) to which front wheels 24 of the vehicle 10 are mounted. The front axle assembly is operatively connected to the body 16 by a second pair of shock absorbers 26 and a pair of helical coil springs 28. The shock absorbers 20 and 26 dampen the relative motion of the unsprung portion (e.g., the front and rear axle assemblies) and the sprung portion (e.g., the body 16) of the vehicle 10. While the vehicle 10 has been depicted as a passenger car having front and rear axle assemblies, the shock absorbers 20, 26 may be used with other types of vehicles or machinery, or in other types of applications such as vehicles incorporating independent front and/or independent rear suspension systems. Further, the term "shock absorber" as used herein is meant to refer to shock absorbers and shock absorber systems in general and thus will include MacPherson struts. It should also be appreciated that the scope of the subject disclosure is intended to include the stand-alone shock absorbers 20 and the coil-over shock absorbers 26.

Figure 2:
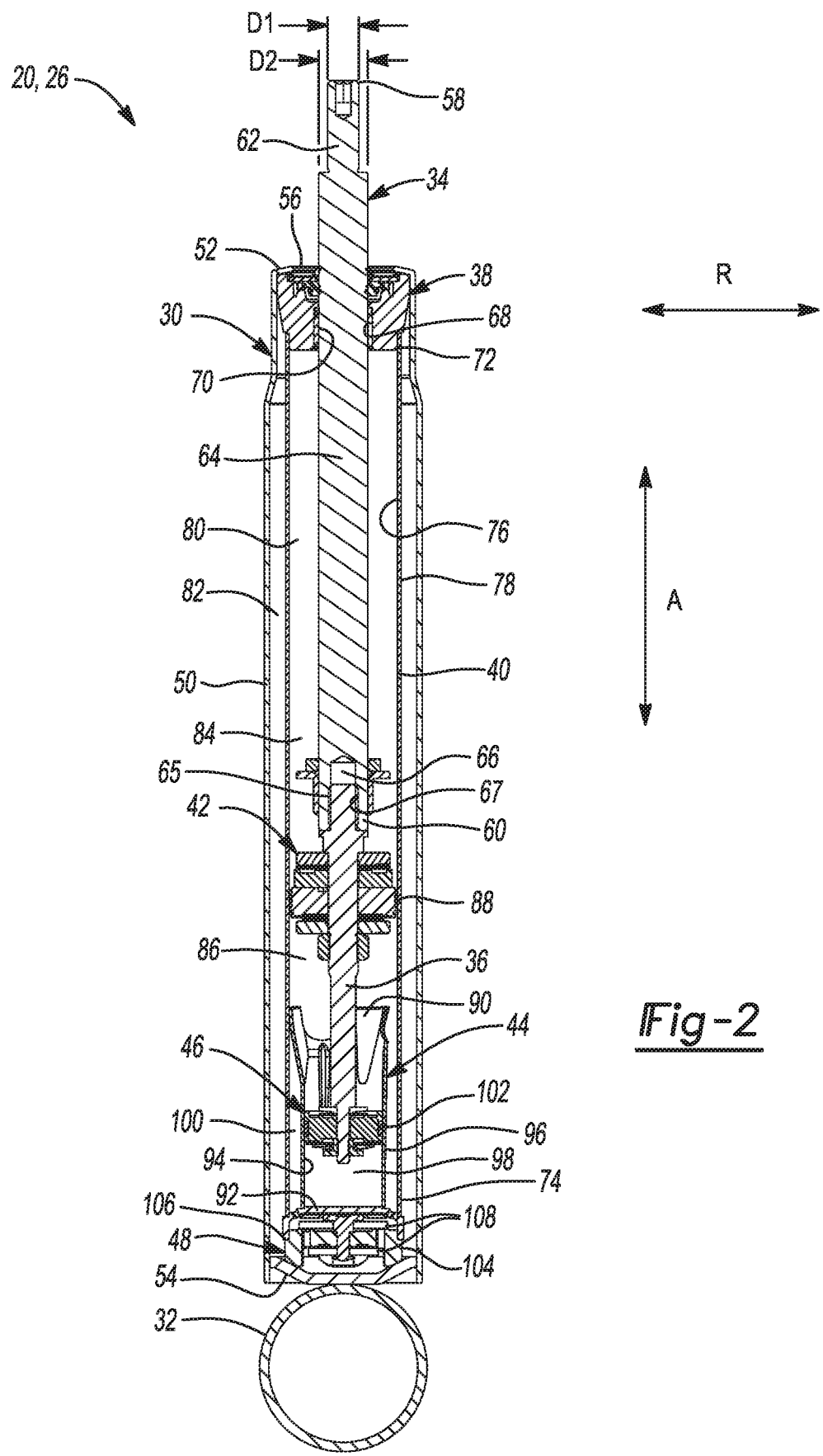
FIG. 2 is a section view of the one of the shock absorbers of FIG. 1 illustrating examples of a hydraulic compression stop (HCS) cup and a HCS piston according to the principles of the present disclosure.

Referring now to FIG. 2, an example of the shock absorber 20 or 26 includes a reservoir tube 30, a lower mount 32, a rod 34, a rod extension 36, a rod guide 38, a pressure tube 40, a first piston 42, a cup 44, a second piston 46, and a base valve 48. The reservoir tube 30 includes a cylindrical body 50, an upper wall 52, and a lower wall 54. The upper wall 52 defines a bore 56 through which the rod 34 extends. The lower mount 32 may be a cylindrical bearing as shown, and a fastener (e.g., a screw) may be inserted through the lower mount 32 to attach the shock absorber 20 or 26 to a control arm or knuckle of the vehicle 10 (FIG. 1). The lower mount 32 is attached (e.g., welded) to the lower wall 54 of the reservoir tube 30.

The rod 34 has an upper end 58 and a lower end 60. The rod 34 includes a first portion 62 configured to be attached to an upper mount (not shown) and a second portion 64 that extends into the reservoir tube 30. The first portion 62 of the rod 34 has a first diameter D1 and the second portion 64 of the rod 34 has a second diameter D2 that is greater than the first diameter D1. The rod extension 36 is attached to the lower end 60 of the rod 34. In one example, the rod extension 36 is attached to the lower end 60 of the rod 34 via external threads 65 on the rod extension 36 that engage internal threads 67 in a blind bore 66 in the second portion 64 of the rod 34. In various implementations, the rod 34 and the rod extension 36 may be formed as a single piece. Alternatively, the rod extension 36 may be position below the first piston 42. For example, the first piston 42 may be disposed about the rod 34 and coupled directly to the rod 34 between its upper and lower ends 58 and 60, and the rod extension 36 may be attached to the lower end 60 of the rod 34.

The rod guide 38 is disposed in the reservoir tube 30 near the upper wall 52 thereof. The rod guide 38 locates or positions the rod 34 and the rod extension 36 in a radial direction R relative to the reservoir tube 30. In the example shown, the rod guide 38 radially positions the rod 34 and the rod extension 36 relative to the reservoir tube 30 such that the rod 34 and the rod extension 36 are coaxial with the reservoir tube 30 (i.e., the reservoir tube 30, the rod 34, and the rod extension 36 have a common central longitudinal axis). The rod guide 38 has an internal bore 68, and the diameter of the internal bore 68 may be only slightly larger than the diameter D2 of the second portion 64 of the rod 34. In addition, the rod guide 38 includes an annular seal 70 that sealingly engages the second portion 64 of the rod 34 to inhibit fluid flow out of the reservoir tube 30 through the internal bore 68 of the rod guide 38. The rod 34 translates through the internal bore 68 in the rod guide 38 in an axial direction A along a longitudinal axis of the shock absorber 20 or 26, and perpendicular to the radial direction R, as the shock absorber 20 or 26 completes a compression stroke or a rebound stroke.

The pressure tube 40 is disposed in the reservoir tube 30. The pressure tube 40 has an upper end 72 attached to the rod guide 38 and a lower end 74 attached to the cup 44. The upper and lower ends 72 and 74 of the pressure tube 40 are attached to the rod guide 38 and the cup 44, respectively, using a press fit, a weld, and/or a fastener. The cup 44 may be formed from metal (e.g., steel). The pressure tube 40 has an inner surface 76 and an outer surface 78. The inner surface 76 of the pressure tube 40 defines a fluid chamber 80. The outer surface 78 of the pressure tube 40 cooperates with the reservoir tube 30 to define a reservoir chamber 82 therebetween.

The first piston 42 is disposed in the fluid chamber 80 of the pressure tube 40 and is coupled to the rod 34 via the rod extension 36. The first piston 42 is attached to the rod extension 36 using a press fit, a weld, and/or a fastener (e.g., threads). The first piston 42 divides the fluid chamber 80 into an upper working chamber 84 and a lower working chamber 86. To this end, the first piston 42 has an outer radial surface 88 that engages the inner surface 76 of the pressure tube 40 to prevent fluid flow between the upper and lower working chambers 84 and 86. The outer diameter of the first piston 42 may be equal to or only slightly less than the inner diameter of the pressure tube 40.

The cup 44 is disposed in the lower working chamber 86 of the pressure tube 40. The cup 44 has an open end 90 configured to receive the second piston 46 and a closed end 92 opposite of the open end 90. The open end 90 of the cup 44 is detached from the pressure tube 40 to allow radial movement of the open end 90 as the second piston 46 enters the cup 44. The closed end 92 of the cup 44 is attached to the base valve 48 using a press fit, a weld, and/or a fastener. The cup 44 has an inner surface 94 and an outer surface 96. The inner surface 94 of the cup 44 defines an interior cavity 98. The outer surface 96 of the cup 44 and the inner surface 76 of the pressure tube 40 define an intermediate chamber 100 therebetween.

The second piston 46 is coupled to the rod 34 via the rod extension 36, is disposed in the lower working chamber 86 of the pressure tube 40, and is configured to be inserted into the interior cavity 98 of the cup 44. The second piston 46 is attached to the rod extension 36 using a press fit, a weld, and/or a fastener (e.g., threads). The second piston 46 includes an annular seal 102 that engages the inner surface 94 of the cup 44 when the second piston 46 is disposed within the interior cavity 98 of the cup 44. The engagement between the annular seal 102 of the second piston 46 and the inner surface 94 of the cup 44 inhibits fluid flow out of the interior cavity 98 of the cup 44 past the second piston 46 as the second piston 46 is inserted into the interior cavity 98 of the cup 44. The outer diameter of the second piston 46 may be equal to or only slightly less than the inner diameter of the cup 44.

The base valve 48 is disposed in the reservoir tube 30 near the lower wall 54 thereof. The base valve 48 regulates fluid flow between the lower working chamber 86 of the pressure tube 40 and the reservoir chamber 82 of the reservoir tube 30. The base valve 48 has an outer radial surface 104 and a ledge 106 formed in the outer radial surface 104. The cup 44 may be attached to the base valve 48 via a press fit between the cup 44 and the ledge 106 on outer radial surface 104 of the base valve 48. The base valve 48 includes one or more discs 108 that regulate fluid flow through the base valve 48.

Figure 3:
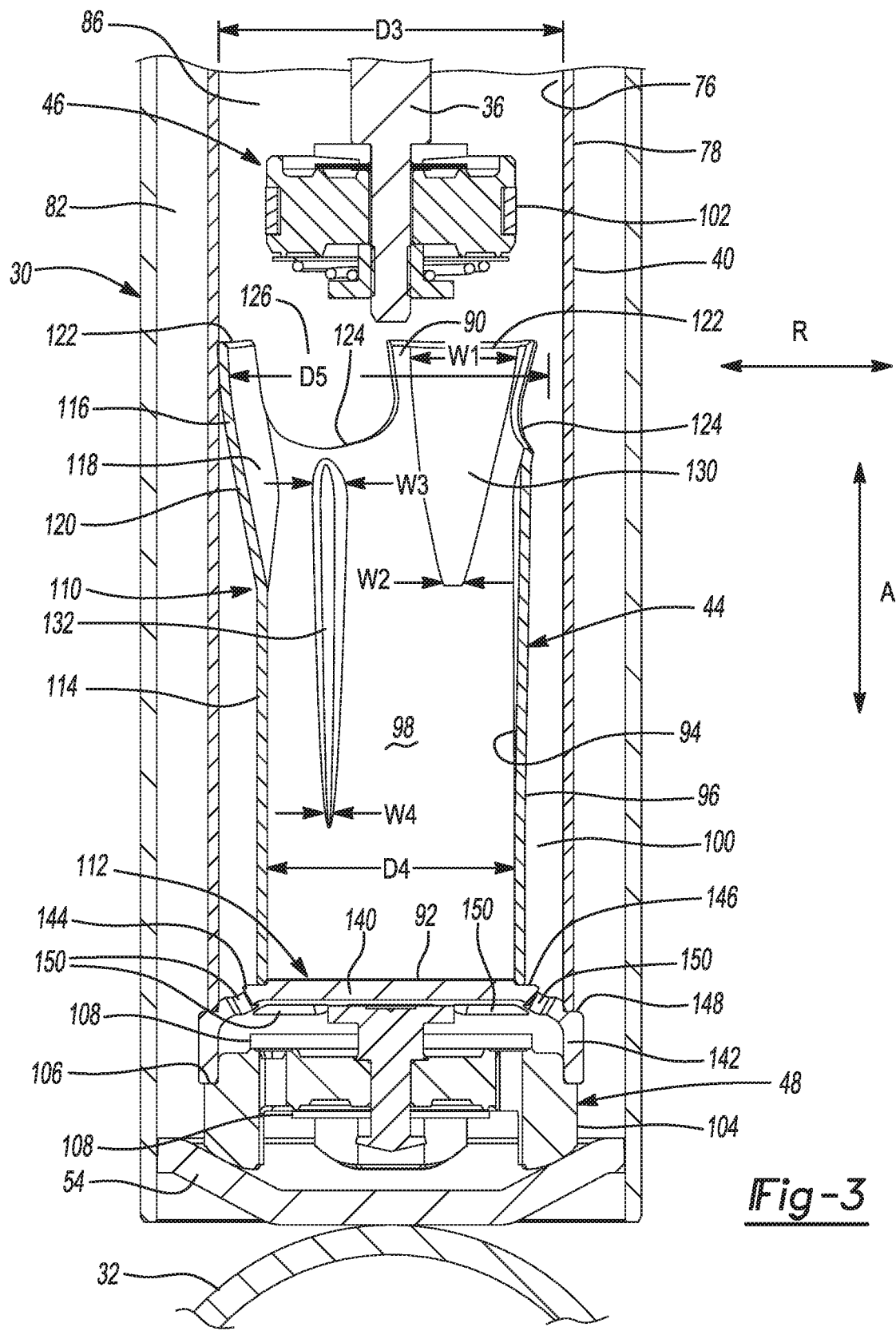
FIG. 3 is an enlarged view of a portion of the shock absorber of FIG. 2 with the HCS piston disposed outside of the HCS cup.
Figure 4:
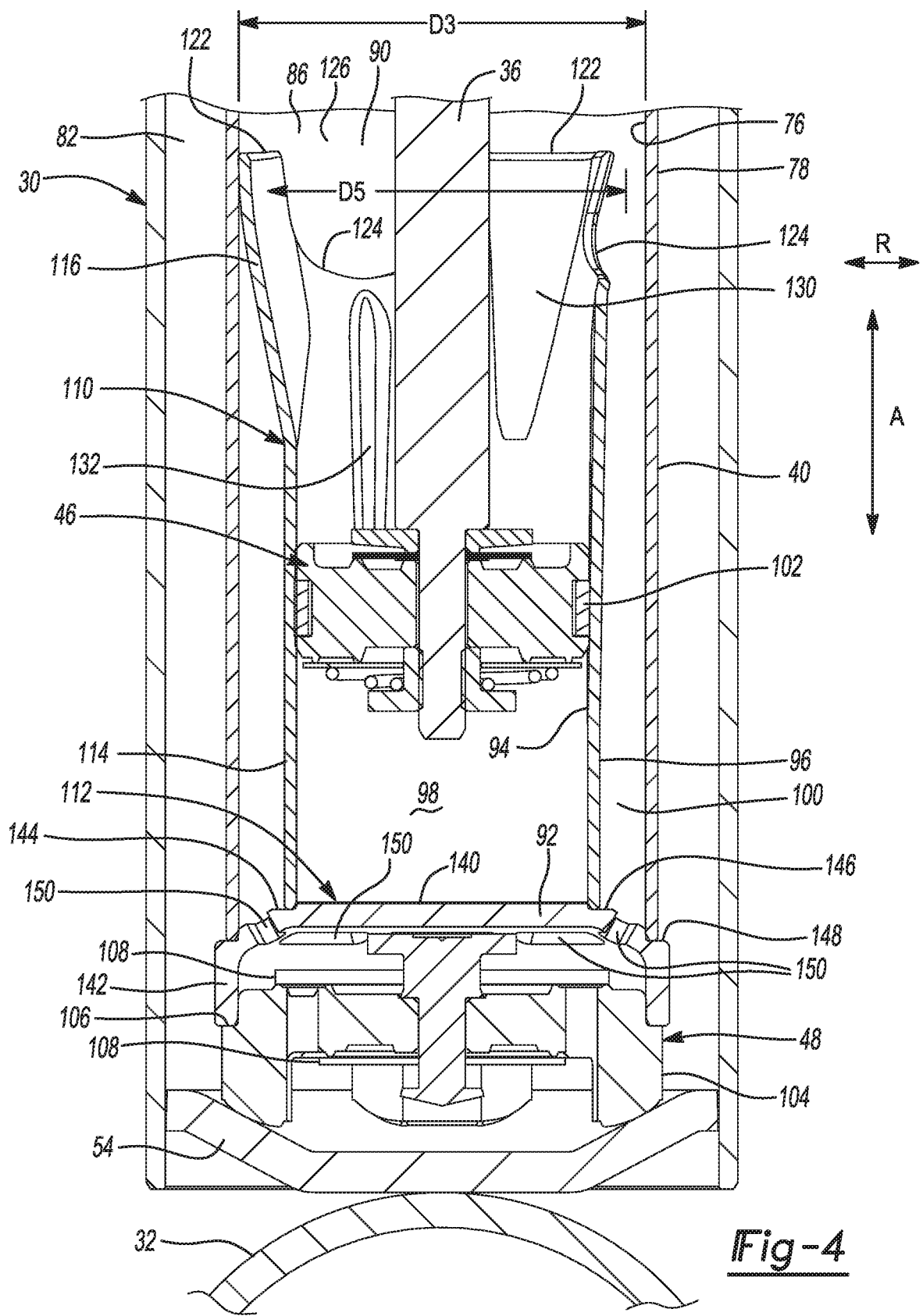
FIG. 4 is an enlarged view of a portion of the shock absorber of FIG. 2 with the HCS piston disposed within the HCS cup.

Referring now to FIGS. 3 and 4, the cup 44 includes a sidewall 110 that forms the open end 90 of the cup 44 and a bottom wall 112 that forms the closed end 92 of the cup 44. The sidewall 110 may be a monolithic structure (i.e., formed as a single piece) as shown. The bottom wall 112 may be a monolithic structure (i.e., formed as a single piece) as shown. The bottom wall 112 may be formed using a stamping or metal injection molding operation, and the edges of the bottom wall 112 may be less sharp or more rounded than shown. The bottom wall 112 is attached to the sidewall 110 using a press fit, a weld (e.g., a friction weld), and/or a fastener. The sidewall 110 includes a cylindrical section 114 and a flared section 116. The cylindrical section 114 extends from the closed end 92 of the cup 44 to the flared section 116. The flared section 116 extends from the cylindrical section 114 to the open end 90 of the cup 44.

The pressure tube 40 has a third diameter D3 and the cylindrical section 114 of the cup 44 has a fourth diameter D4 that is less than the third diameter D3. The flared section 116 of the cup 44 is tapered radially outward in the upward axial direction from the cylindrical section 114 of the cup 44 to the open end 90 of the cup 44. The flared section 116 has a fifth diameter D5 at the open end 90 of the cup 44 that is greater than the fourth diameter D4 of the cylindrical section 114 and is less than the third diameter D3 of the pressure tube 40.

The flared section 116 of the cup 44 radially locates the cup 44 relative to the pressure tube 40 and guides the second piston 46 into the cylindrical section 114 of the cup 44. The flared section 116 has an inner surface 118 and an outer surface 120. Both the inner and outer surfaces 118 and 120 of the flared section 116 are tapered radially outward in the upward axial direction from the cylindrical section 114 of the cup 44 to the open end 90 of the cup 44.

Figure 5:
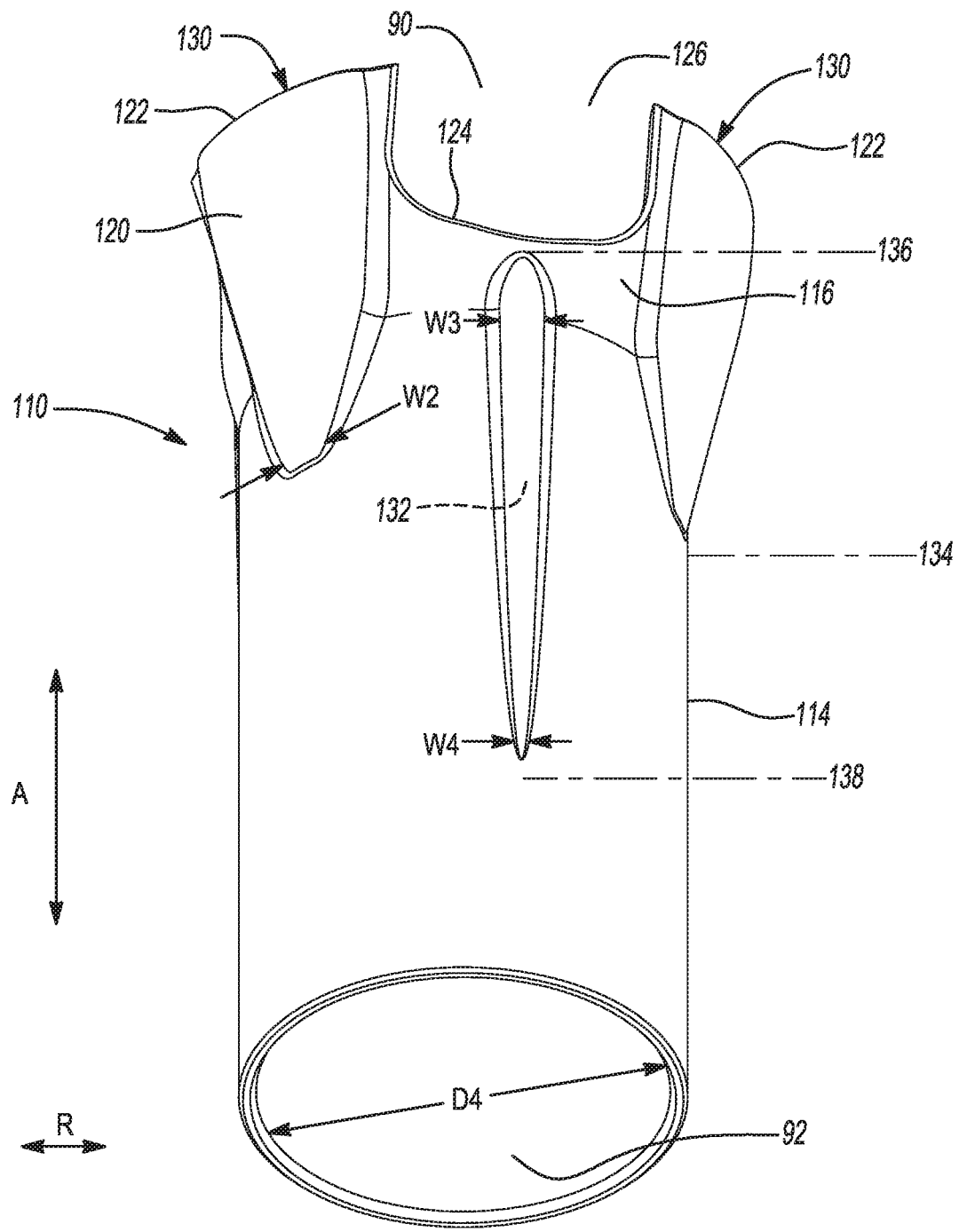
FIGS. 5 and 6 are perspective views of the HCS cup of FIG. 2.
Figure 6:
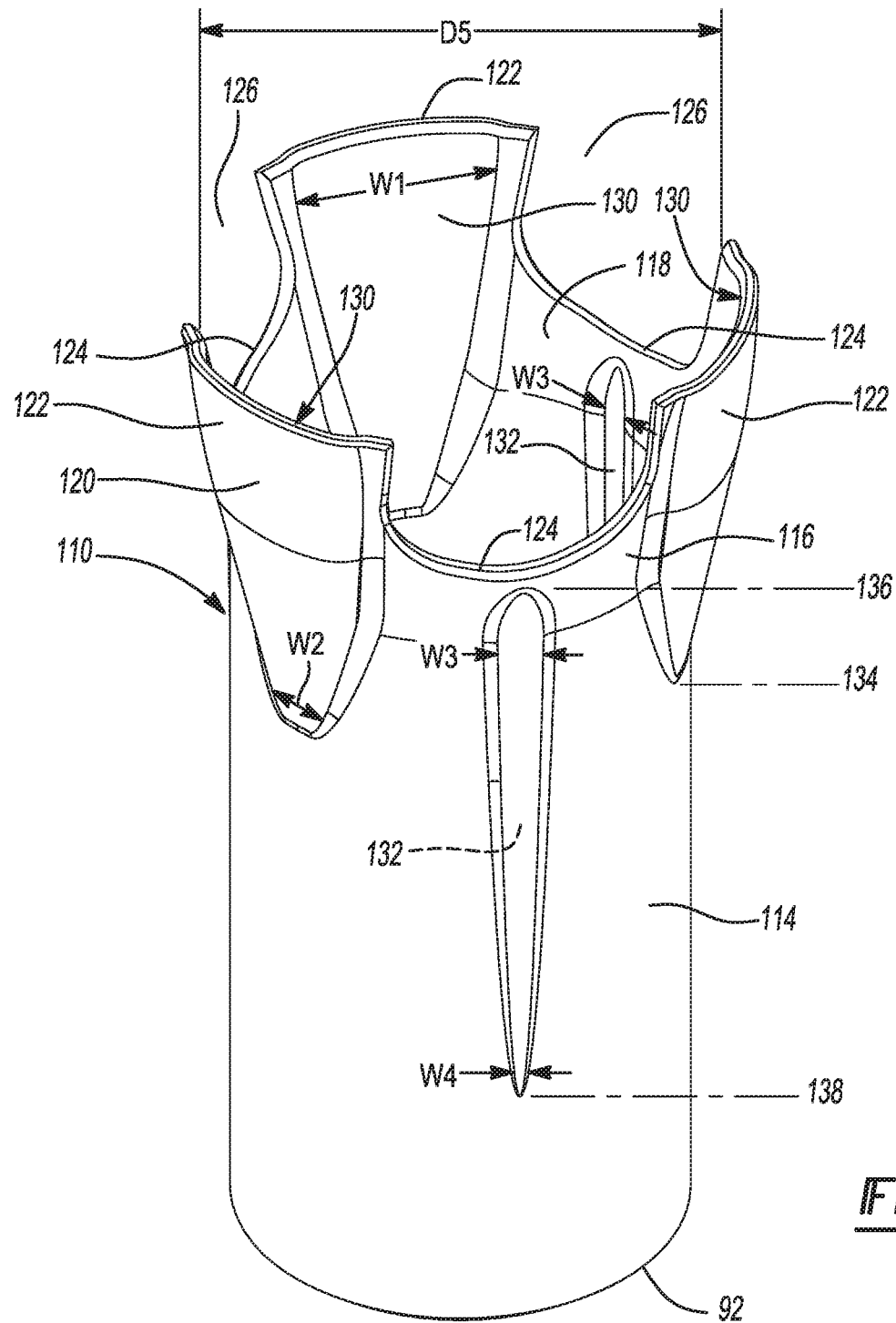

With additional reference to FIGS. 5 and 6, the flared section 116 of the cup 44 includes three tabs 122 that are disposed about the open end 90 of the cup 44 and are separated by three ports 124. The tabs 122 project upward in the axial direction A from the remainder of the flared section 116. In addition, the tabs 122 project radially outward relative to the cylindrical section 114 of the cup 44, which enables using the outer diameter defined by the tabs 122 to locate the cup 44 relative to the inner surface 76 or inner diameter of the pressure tube 40. Using the outer diameter defined by the tabs 122 to locate the cup 44 relative to the inner diameter of the pressure tube 40 avoids the need for a close tolerance at the open end 90 of the cup 44.

The tabs 122 define the fifth diameter D5 of the flared section 116. The ports 124 are U-shaped and have open ends 126 that are aligned with the open end 90 of the cup 44 in the axial direction A. The ports 124 form passageways for fluid flow from the lower working chamber 86 to the intermediate chamber 100 defined between the cup 44 and the pressure tube 40.

The difference between the third and fifth diameters D3 and D5 of the pressure tube 40 and the flared section 116, respectively, yield a clearance fit (e.g., a slip fit) and/or a location fit (e.g., a line-to-line fit) between the open end 90 of the cup 44 and the pressure tube 40. In one example, the fifth diameter D5 of the flared section 116 is only slightly less than the third diameter D3 of the pressure tube 40 such that the open end 90 of the cup 44 contacts the pressure tube 40. More specifically, each of the tabs 122 contacts the pressure tube 40, and no other portion of the cup 44 contacts the pressure tube 40. In another example, the fifth diameter D5 of the flared section 116 is less than the third diameter D3 of the pressure tube 40 such that the open end 90 of the cup 44 is spaced apart from the pressure tube 40 by a small gap. In various implementations, the open end 90 of the cup 44 may be bent radially outward an angle (e.g., 90 degrees) relative to the flared section 116 such that only the distal end or tip of the open end 90 contacts the pressure tube 40. In this regard, the open end 90 of the cup 44 may form a flange (not shown) that extends around the perimeter of the cup 44.

The sidewall 110 of the cup 44 has a first set of grooves 130 that are each circumferentially aligned with one of the tabs 122, and a second set of grooves 132 that are each circumferentially aligned with one of the ports 124. The grooves 130 allow fluid flow out of the interior cavity 98 of the cup 44 past the second piston 46 as the second piston 46 enters the interior cavity 98. The grooves 132 allow fluid flow out of the interior cavity 98 of the cup 44 past the second piston 46 as the second piston 46 moves further into the interior cavity 98.

The grooves 130 extend in the axial direction A from the open end 90 of the cup 44 to the cylindrical section 114. More specifically, the grooves 130 extend to an axial location 134 (FIGS. 5 and 6) in the cylindrical section 114 that is just below the junction between the cylindrical and flared sections 114 and 116. The grooves 132 extend in the axial direction A from an axial location 136 (FIGS. 5 and 6) in the flared section 116 that is just below the ports 124 to an axial location 138 (FIGS. 5 and 6) in the cylindrical section 114 that is adjacent to the closed end 92 of the cup 44.

The inner surface 94 of the cup 44 at the grooves 130 is recessed relative to portions of the inner surface 94 adjacent to and surrounding the grooves 130, and the outer surface 96 of the cup 44 at the grooves 130 projects radially outward relative to portions of the outer surface 96 adjacent to and surrounding the grooves 130. Similarly, inner surface 94 of the cup 44 at the grooves 132 is recessed relative to portions of the inner surface 94 adjacent to and surrounding the grooves 132, and the outer surface 96 of the cup 44 at the grooves 132 projects radially outward relative to portions of the outer surface 96 adjacent to and surrounding the grooves 132.

Each of the grooves 130 has a first width W1 at the open end 90 of the cup 44 and a second width W2 at the axial location 134 that is less than the first width W1. Thus, the width of the grooves 130 decreases in the downward axial direction from the open end 90 of the cup 44 to the cylindrical section 114. Similarly, each of the grooves 132 has a third width W3 at the junction between the at the open end 90 of the cup 44 and a second width W2 at the axial location 138 that is less than the first width W1. Thus, the width of the grooves 132 generally decreases in the downward axial direction from the flared section 116 to the cylindrical section 114.

With continued reference to FIGS. 3 and 4, the bottom wall 112 of the cup 44 extends radially outward of the sidewall 110 and includes a disk-shaped section 140, a cylindrical section 142, and a curved section 144 that provides a transition from the disk-shaped section 140 to the cylindrical section 142. The bottom wall 112 defines a ledge 146 at the junction between the disk-shaped section 140 and the curved section 144 and a ledge 148 at the junction between the curved section 144 and the cylindrical section 142. The sidewall 110 of the cup 44 is seated in the ledge 146 in the bottom wall 112 and is attached to the ledge 146 using a press fit, a weld (e.g., a friction weld), and/or a fastener. The pressure tube 40 is seated in the ledge 148 in the bottom wall 112 and is attached to the ledge 148 using a press fit and/or a fastener. Thus, the bottom wall 112 supports the pressure tube 140.

The curved section 144 of the bottom wall 112 defines a plurality of ports 150. The ports 150 provide fluid passageways for fluid flow between the intermediate chamber 100 and the reservoir chamber 82. The ports 150 have an elongated shape such as an elliptical shape. The longitudinal axis of each of the ports 150 generally extends in the circumferential direction of the shock absorber 20 or 26.

Referring now to FIGS. 2-6, operation of the shock absorber 20 or 26 will now be described. During the compression stroke of the shock absorber 20 or 26, the rod 34, the rod extension 36, the first piston 42, and the second piston 46 move downward in the axial direction A (i.e., in the axial direction A toward the lower wall 54 of the reservoir tube 30). In turn, the first piston 42 forces fluid (e.g., oil) to flow from the lower working chamber 86 of the pressure tube 40 to the intermediate chamber 100 through the ports 124 in the sidewall 110 of the cup 44, and from the intermediate chamber 100 to the base valve 48 through the ports 150 in the cup 44. The base valve 48 regulates fluid flow from the intermediate chamber 100 to the reservoir chamber 82, and thereby controls the amount of damping provided by the shock absorber 20 or 26.

As the second piston 46 moves downward in the axial direction A, the second piston 46 moves from a position in the lower working chamber 86 outside of the interior cavity 98 of the cup 44, as shown in FIG. 3, to a position within the interior cavity 98, as shown in FIG. 4. In turn, the second piston 46 pressurizes fluid in the interior cavity 98 of the cup 44, which increases the amount of damping provided by the shock absorber 20 or 26. In this regard, (hydraulic) fluid pressurized between the cup 44 and the second piston 46 provides a stopping force that acts on the rod 34 via the rod extension 36 and the second piston 46 as the shock absorber 20 or 26 reaches the end of its compression stroke. Thus, the cup 44 may be referred to as a hydraulic compression stop (HCS) cup and the second piston 46 may be referred to as a HCS piston. In various implementations, the shock absorber 20 or 26 may include a spring (not shown) disposed in the center of the cup 44 between the second piston 46 and the closed end 92 of the cup 44. The spring may cooperate with the cup 44 to provide a soft stop for the second piston 46.

The grooves 130 on the inner surface 94 of the cup 44 allow some fluid to flow out of the interior cavity 98 of the cup 44 past the second piston 46 as the second piston 46 enters the interior cavity 98, which avoids a rapid spike in the amount of damping provided by the shock absorber 20 or 26. Since the width of the grooves 130 decreases in the downward axial direction, the amount of fluid allowed to flow out of the interior cavity 98 of the cup 44 past the second piston 46 (through the grooves 130) decreases as the second piston 46 moves further into the interior cavity 98. In turn, the amount of damping provided by the shock absorber 20 or 26 gradually increases.

The grooves 132 on the inner surface 94 of the cup 44 allow some fluid to flow out of the interior cavity 98 of the cup 44 past the second piston 46 as the second piston 46 moves further into the interior cavity 98 and past the grooves 130. Since the width of the grooves 132 decreases in the downward axial direction, the amount of fluid allowed to flow out of the interior cavity 98 of the cup 44 past the second piston 46 (through the grooves 132) decreases as the second piston 46 moves further into the interior cavity 98. In turn, the amount of damping provided by the shock absorber 20 or 26 gradually increases and reaches its maximum once the second piston is completely past the grooves 132.

When the second piston 46 initially enters the interior cavity 98 of the cup 44, the flared section 116 of the cup 44 guides the second piston 46 into the cylindrical section 114 of the cup 44 and ensures that the second piston 46 is coaxial with the cylindrical section 114. More specifically, the tapered inner surface 118 of the flared section 116 engages the annular seal 102 on the second piston 46 to ensure a smooth transition as the second piston 46 enters the portion of the interior cavity 98 that is disposed within the cylindrical section 114. If the second piston 46 is misaligned in the radial direction R relative to the cup 44 (e.g., the second piston 46 is not coaxial with the cup 44), the engagement between the tapered inner surface 118 and the annular seal 102 compresses the annular seal 102 in the radial direction R. In this way, the flared section 116 and the annular seal 102 cooperate to prevent damage to the cup 44 and the second piston 46 caused by misalignment of the second piston 46 relative to the cup 44.

In addition, the tapered outer surface 120 of the flared section 116 ensures that the cup 44 is coaxial with the pressure tube 40, which ensures that the tapered inner surface 118 of the flared section 116 properly aligns the second piston 46 in the radial direction R. Further, since the open end 90 of the cup 44 is detached from the pressure tube 40, the open end 90 is allowed to deflect in the radial direction R to absorb any initial misalignment between the second piston 46 and the cylindrical section 114. For example, if the second piston 46 is misaligned with the cylindrical section 114 when the second piston 46 enters the interior cavity 98, the second piston 46 contacts the internal surface 118 of the flared section 116. In turn, the tabs 122 may deflect radially outward to absorb energy that may otherwise damage the second piston 46. The tabs 122 may return to their original state once the second piston 46 is properly aligned.

Figure 7:
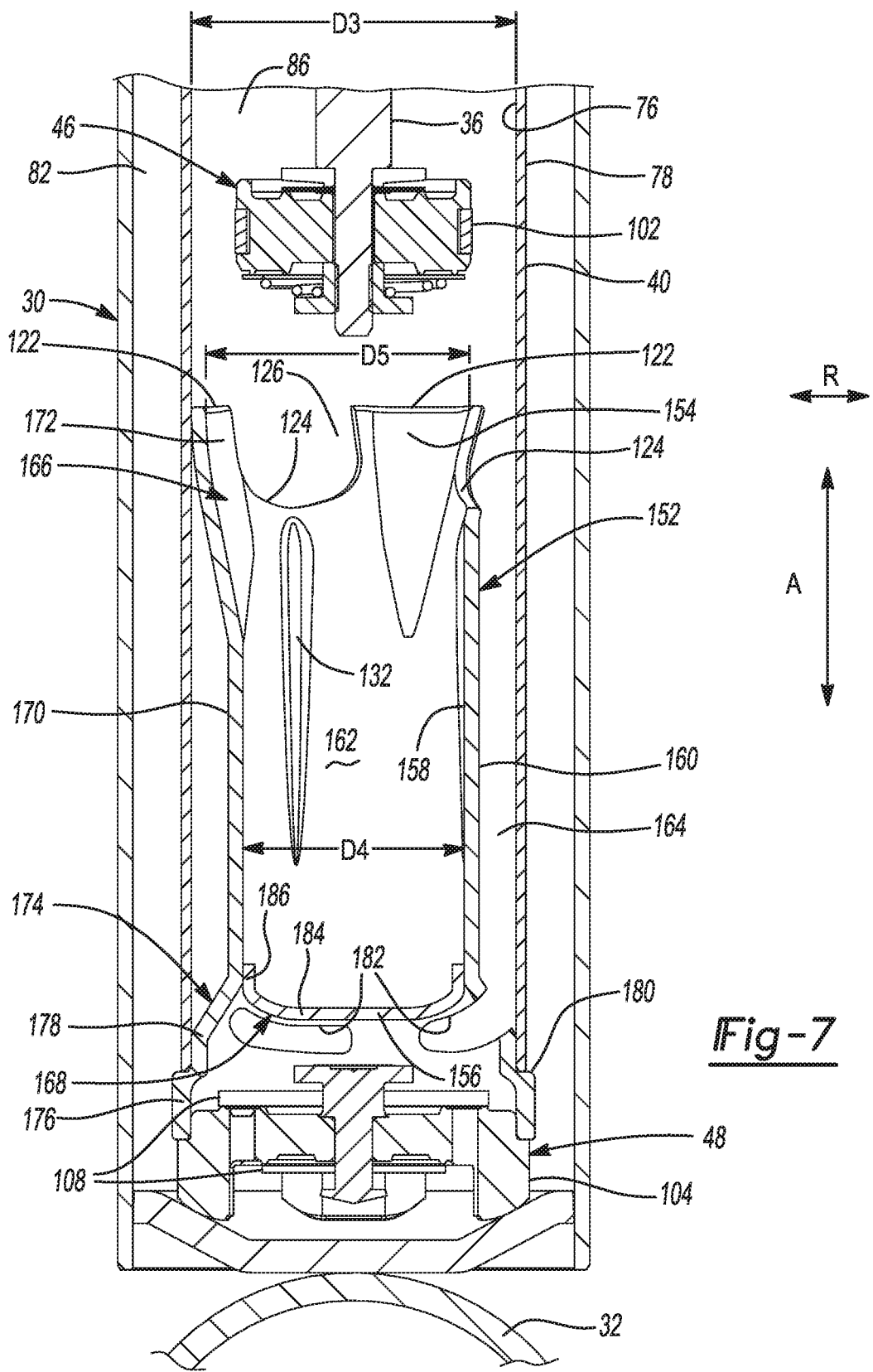
FIGS. 7 is a section view of another shock absorber according to the present disclosure.

Referring now to FIG. 7, an alternative embodiment of the shock absorber 20 or 26 is similar to the embodiment shown in FIGS. 2-6 except that the shock absorber 20 or 26 includes a cup 152 in place of the cup 44. Like the cup 44, the cup 152 is disposed in the lower working chamber 86 of the pressure tube 40. In addition, the cup 152 has an open end 154 configured to receive the second piston 46 and a closed end 156 opposite of the open end 154. The open end 154 of the cup 152 is detached from the pressure tube 40 to allow radial movement of the open end 154 as the second piston 46 enters the cup 152. The closed end 156 of the cup 152 is attached to the base valve 48 using a press fit, a weld, and/or a fastener. The cup 152 has an inner surface 158 and an outer surface 160. The inner surface 158 of the cup 152 defines an interior cavity 162. The outer surface 160 of the cup 152 and the inner surface 76 of the pressure tube 40 define an intermediate chamber 164 therebetween.

Also like the cup 44, the cup 152 includes a sidewall 166 that forms the open end 154 of the cup 152 and a bottom wall 168 that forms the closed end 156 of the cup 152. The bottom wall 168 is attached to the sidewall 166 using a press fit, a weld (e.g., a friction weld), and/or a fastener. In contrast to the sidewall 110 of the cup 44, the sidewall 166 of the cup 152 extends axially beyond the bottom wall 168 in the downward direction (e.g., the direction toward the bottom wall 54 the reservoir tube 30).

The sidewall 166 includes an upper cylindrical section 170, a flared section 172, and an adaptor portion 174. The upper cylindrical section 170 and the flared section 172 of the cup 152 are similar or identical to the cylindrical section 114 and the flared section 116, respectively, of the cup 44. The adaptor portion 174 of the cup 152 is similar to the bottom wall 112 of the cup 44 except that the adaptor portion 174 does not include the disk-shaped section 140 and the adaptor portion 174 does not define the ledge 146. However, the adaptor portion 174 does include a lower cylindrical section 176 and a curved section 178 that provides a transition from the upper cylindrical section 170 to the lower cylindrical section 176. In addition, the adaptor portion 174 defines a ledge 180 at the junction between the curved section 178 and the lower cylindrical section 176. The pressure tube 40 is seated in the ledge 180 in the adaptor portion 174 and is attached to the ledge 180 using a press fit, a weld, and/or a fastener.

The curved section 178 of the adaptor portion 174 defines a plurality of ports 182. The ports 182 provide fluid passageways for fluid flow between the intermediate chamber 164 and the reservoir chamber 82. The ports 182 have an elongated shape such as an elliptical shape. The longitudinal axis of each of the ports 182 generally extends in the circumferential direction of the shock absorber 20 or 26.

The bottom wall 168 of the cup 152 acts as a cap or plug for the closed end 156 of the cup 152. The bottom wall 168 includes a disk-shaped section 184 and a cylindrical section 186 that extends axially upward from the disk-shaped section 184. The cylindrical section 186 may be welded (e.g., friction welded) to the inner surface 158 of the sidewall 166 of the cup 152. In contrast to the bottom wall 112 of the cup 44, the bottom wall 168 is not directly attached to the base valve 48. Instead, the bottom wall 168 is attached to the sidewall 166, which is attached to the base valve 48. Thus, there is no need to control the concentricity of the sidewall 166 or the bottom wall 168 when attaching (e.g., welding) the bottom wall 168 to the sidewall 166. In other words, the concentricity of the sidewall 166 is independent of the attachment (e.g., the weld) between the sidewall 166 and the bottom wall 168.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

What is claimed is:

1. A shock absorber comprising:
a pressure tube having an inner surface that defines a fluid chamber;
a rod extending into the pressure tube;
a rod guide disposed in the pressure tube, the rod guide radially locating the rod relative to the pressure tube;
a first piston coupled to the rod and disposed within the fluid chamber, the first piston dividing the fluid chamber into an upper working chamber and a lower working chamber;
a second piston coupled to the rod and disposed within the lower working chamber of the pressure tube; and
a cup disposed within the lower working chamber of the pressure tube, the cup having an open end configured to receive the second piston and a closed end opposite of the open end, the cup including a sidewall and a monolithic bottom wall, the sidewall including a cylindrical section and a flared section, the cylindrical section extending from the closed end of the cup to the flared section, the flared section extending from the cylindrical section to the open end of the cup, the flared section being configured to radially locate the cup relative to the pressure tube and to guide the second piston into the cylindrical section, the bottom wall forming the closed end of the cup, extending radially outward of the sidewall, and supporting the pressure tube;
wherein the bottom wall defines a ledge; and
wherein the pressure tube is seated in the ledge and attached to the ledge.

2. The shock absorber of claim 1 wherein:
the cup is made from metal;
the pressure tube has a first diameter;
the cylindrical section of the cup has a second diameter that is less than the first diameter; and
the flared section of the cup is tapered radially outward in an axial direction from the cylindrical section of the cup to the open end of the cup.

3. The shock absorber of claim 2 wherein:
the flared section has a third diameter at the open end of the cup; and
the third diameter is less than the first diameter and greater than the second diameter.

4. The shock absorber of claim 3 wherein a difference between the first and third diameters yields at least one of a clearance fit and a location fit between the open end of the cup and the pressure tube.

5. The shock absorber of claim 1 further comprising:
a reservoir tube surrounding the pressure tube; and
a base valve disposed in the reservoir tube near an end thereof and configured to regulate fluid flow from the lower working chamber of the pressure tube to a reservoir chamber defined between the pressure tube and the reservoir tube, wherein at least one of the sidewall and the bottom wall is attached to the pressure tube and the base valve.

6. The shock absorber of claim 5 wherein the bottom wall is press fit to an outer radial surface of the base valve.

7. The shock absorber of claim 1 wherein the cup has an inner surface defining an interior cavity and an outer surface cooperating with the pressure tube to define an intermediate chamber therebetween and wherein the flared section defines a plurality of ports disposed about the open end of the cup and forming fluid passageways for fluid flow from the lower working chamber to the intermediate chamber between the outer surface of the cup and the pressure tube.

8. The shock absorber of claim 7 wherein each of the plurality of ports is U-shaped and has an open end that is axially aligned with the open end of the cup.

9. The shock absorber of claim 1 wherein the open end of the cup contacts the inner surface of the pressure tube.

10. The shock absorber of claim 1 wherein the open end of the cup is spaced apart from the inner surface of the pressure tube by a gap.

11. The shock absorber of claim 1 wherein the bottom wall of the cup is welded to the sidewall of the cup.

12. A shock absorber comprising:
a pressure tube defining a fluid chamber;
a rod extending into the pressure tube;
a rod guide disposed in the pressure tube, the rod guide radially locating the rod relative to the pressure tube;
a first piston coupled to the rod and disposed within the fluid chamber, the first piston dividing the fluid chamber into an upper working chamber and a lower working chamber;
a second piston coupled to the rod and disposed within the lower working chamber of the pressure tube; and a cup disposed within the lower working chamber of the pressure tube, the cup having an open end configured to receive the second piston and a closed end opposite of the open end, the cup including a monolithic sidewall and a bottom wall, the sidewall including a cylindrical section and a flared section, the cylindrical section extending in a first direction from the closed end of the cup to the flared section, the flared section extending in the first direction from the cylindrical section to the open end of the cup, the flared section being configured to radially locate the cup relative to the pressure tube, the bottom wall forming the closed end of the cup, the sidewall extending axially beyond the bottom wall in a second direction opposite of the first direction and supporting the pressure tube;

wherein the sidewall defines a ledge; and the pressure tube is seated in the ledge and attached to the ledge.

13. The shock absorber of claim 12 wherein:

the cup has an inner surface defining an interior cavity and an outer surface that is tapered radially outward along the flared section;

the cup has a plurality of grooves on the inner surface thereof that extend from the open end of the cup to the cylindrical section; and the plurality of grooves allow fluid flow out of the interior cavity of the cup past the second piston as the second piston enters the interior cavity of the cup.

14. The shock absorber of claim 13 wherein the flared section of the cup includes a plurality of tabs separated by a plurality of ports, the plurality of tabs projecting radially outward relative to the cylindrical section of the cup, each of the grooves being aligned with one of tabs, the plurality of ports extending to the open end of the cup.

15. The shock absorber of claim 14 wherein each of the grooves have a first width at the open end of the cup and a second width in the cylindrical section of the cup, the second width being less than the first width.

16. The shock absorber of claim 12 further comprising:

a reservoir tube surrounding the pressure tube; and a base valve disposed in the reservoir tube near an end thereof and configured to regulate fluid flow from the lower working chamber of the pressure tube to a reservoir chamber defined between the pressure tube and the reservoir tube, wherein the sidewall is attached to the pressure tube and the base valve.

17. The shock absorber of claim 16 wherein the sidewall is press fit to an outer radial surface of the base valve.

* * * * *